April 28, 1942.   E. I. POLLARD   2,280,974
DAMPER WINDING
Filed June 30, 1939   2 Sheets-Sheet 1

WITNESSES:
Leon M. Garman
F. P. Lyle

INVENTOR
Ernest I. Pollard.
BY
O. B. Buchanan
ATTORNEY

April 28, 1942.   E. I. POLLARD   2,280,974
DAMPER WINDING
Filed June 30, 1939   2 Sheets-Sheet 2

WITNESSES:
Leon M. Farman
F. P. Lyle

INVENTOR
Ernest I. Pollard.
BY
O B Buchanan
ATTORNEY

Patented Apr. 28, 1942

2,280,974

UNITED STATES PATENT OFFICE 2,280,974

DAMPER WINDING

Ernest I. Pollard, Irwin, Pa., assignor to Westinghouse Electric & Manufacturing Company, East Pittsburgh, Pa., a corporation of Pennsylvania Application June 30, 1939, Serial No. 282,157

2 Claims. (Cl. 172—120)

The present invention relates to damper windings for synchronous dynamo-electric machines, and more particularly to a damper winding of the type which is not connected between adjacent pole pieces.

In the usual design of synchronous dynamo-electric machines with salient pole rotors, a damper winding is provided on the rotor which consists of a plurality of conducting bars placed in slots in the pole faces, with the bars on each pole piece connected together at both ends and with bolted connections between the bars on adjacent pole pieces to form a continuous short-circuited winding similar to a squirrel-cage winding. In machines of large size, however, such as waterwheel-driven generators, in which the rotors are of large diameter and the peripheral speeds are quite high, it is sometimes considered undesirable to have bolted connections on the rotor, and in some cases the connections between pole pieces are omitted and a damper winding is used in which the bars on each pole piece are connected together but no connection is provided between adjacent pole pieces. This construction also has the advantage that it permits a material reduction in the cost of the rotor.

When the conventional damper winding is used, the direct axis sub-transient reactance and the quadrature axis sub-transient reactance are approximately equal, since substantially all the flux produced by both the direct axis and quadrature axis components of the armature current is linked by the damper winding. When the winding is not connected between poles, however, the quadrature axis subtransient reactance is considerably higher than the direct axis sub-transient reactance, because practically all of the direct axis flux is linked by the damper winding while only a part of the quadrature axis flux links the winding. This condition is undesirable since, under certain short circuit conditions, it may cause very high voltages at the terminals of the generator, and for this reason, when a damper winding is used which is not connected between poles, it should be designed so that the ratio of quadrature axis to direct axis sub-transient reactance will not be too high.

The object of the present invention is to provide a damper winding of the type which is not connected between adjacent pole pieces and in which the quadrature axis sub-transient reactance will not be much larger than the direct axis sub-transient reactance.

More specifically, the object of the invention is to provide a damper winding which is not connected between adjacent pole pieces, and in which the damper bars are so arranged that the winding will link a substantial part of the flux produced by the quadrature axis component of the armature current, so that the value of the quadrature axis sub-transient reactance will not be undesirably high. This is done by providing additional damper bars on each pole piece, which are placed below the pole face and outside of the usual bars in the pole face so that the winding will link a considerably greater portion of the quadrature axis flux than would be linked by the conventional winding.

The invention will more fully be understood from the following detailed description, taken in connection with the accompany drawings, in which.

Figure 1:
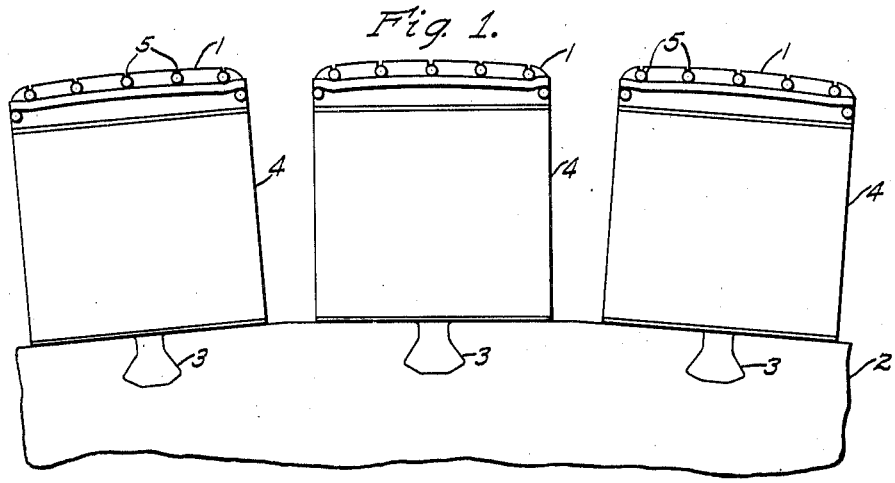
Figure 1 is a fragmentary elevational view of a salient pole rotor for a large synchronous generator.

Figure 1 shows in elevation a portion of the rotor of a large synchronous generator having a plurality of salient pole pieces 1 secured to a rotor spider 2 of any suitable construction by means of dovetails 3. Each pole piece carries the usual direct current field winding 4 and also has a damper winding generally indicated at 5. It will be observed that the damper winding consists of a plurality of bars on each pole piece which are connected together, but that there are no connections between the adjacent pole pieces.

Figure 2:
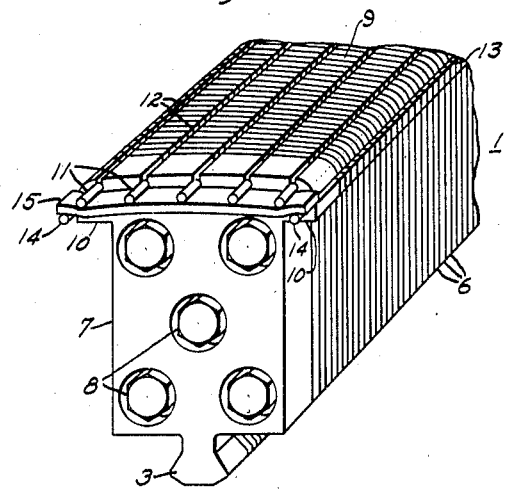
Fig. 2 is a perspective view of one end of a single pole piece showing the arrangement of the damper winding.

The arrangement of the damper winding is shown more clearly in Fig. 2, which is a perspective view of one end of a single pole piece, the other end being exactly identical. As shown in this figure, the pole piece is of laminated construction, being composed of laminations 6 which are clamped between end plates 7 by means of bolts 8 extending through the pole piece. The pole pieces are of the usual shape, having an outer peripheral face 9 and laterally extending pole tips 10. The damper winding consists of a plurality of conducting bars 11, preferably of copper, which are placed in slots 12 in the pole face in the usual manner. In addition, slots 13 are provided in the lateral surfaces of the pole tips 10, and additional damper bars 14 are placed in these slots on each side of the pole piece. A copper segment 15 extends across the end of the pole piece and is soldered or brazed to the ends of the damper bars 11 and 14 to connect them together.

Figure 3:
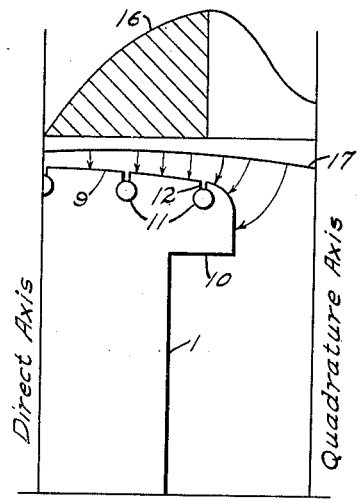
Figs. 3 and 4 are diagrams showing the effect of the damper winding.
Figure 4:
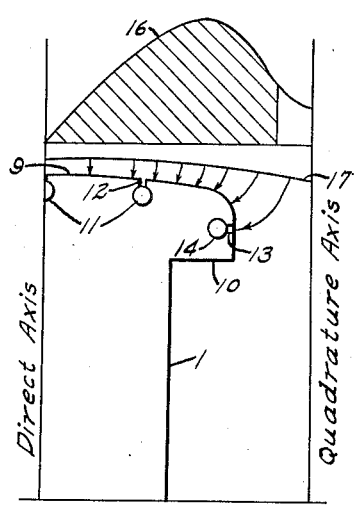

The effect of the additional bars 14 in reducing the quadrature axis sub-transient reactance will be more readily understood from a consideration of Figs. 3 and 4. In each of these figures, the curve 16 shows the distribution of the flux produced by the quadrature axis component of armature current, while the lower part of the figure shows the direction of the flux between the armature surface 17 and the pole face 9, and the relation between the flux and the damper winding. Fig. 3 shows the conventional arrangement with damper bars in the pole face only, and the shaded area under the curve 16 in this figure represents the proportion of the total quadrature axis flux which is linked by the damper winding. This flux produces circulating currents between the damper bars which tend to oppose the flux and diminish its magnitude, thus tending to reduce the magnitude of the quadrature axis sub-transient reactance. Obviously, the effect of the damper winding in reducing the sub-transient reactance depends upon the amount of the total flux which it links. Fig. 4 shows the effect of the additional damper bars 14 placed below the pole face and outside of the bars 11. It will be readily apparent from this figure that this winding links a much larger proportion of the quadrature axis flux than the conventional winding shown in Fig. 3, and it is, therefore, much more effective in reducing the magnitude of the quadrature axis sub-transient reactance, and thus makes possible a very low ratio of quadrature axis to direct axis sub-transient reactance.

Figure 5:
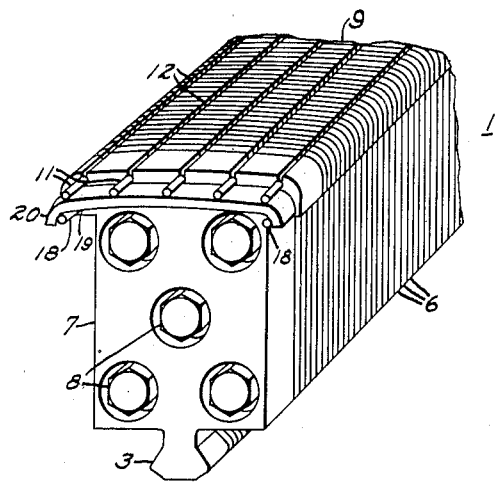
Fig. 5 is a perspective view of one end of a pole piece showing a modified form of damper winding.
Figure 6:
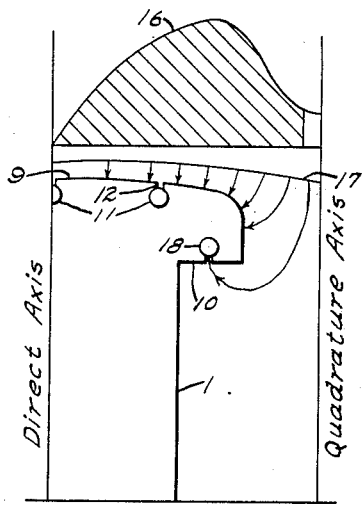
Fig. 6 is a diagram illustrating the effect of the damper winding of Fig. 5.

Fig. 5 shows a slightly modified embodiment of the invention which is somewhat more effective in reducing the quadrature axis sub-transient reactance. The damper winding shown in this figure, as before, has a plurality of bars 11 placed in slots 12 in the pole face, but in this embodiment, additional damper bars 18 are placed in slots 19 in the bottom surfaces of the pole tips. A segment 20 is soldered or brazed to the ends of all the damper bars 11 and 18 to connect them together. The effect of this modification of the invention may be seen from Fig. 6, which is a diagram similar to Figs. 3 and 4, and it will be apparent that a still larger proportion of the quadrature axis flux is linked by the damper winding than in the previous embodiment of the invention, so that a still lower ratio of quadrature axis to direct axis sub-transient reactance is obtained.

It should now be apparent that a damper winding of the type which is not connected between adjacent pole pieces has been provided in which a very low ratio of quadrature axis to direct axis sub-transient reactance is obtained. It should be understood that the invention is capable of various modifications and embodiments so long as the fundamental principle is retained of providing damper bars in the pole face and additional bars on each pole piece which are placed below the pole face and laterally displaced from the bars in the pole face, so that a much larger portion of the quadrature axis flux is linked by the winding and the quadrature axis sub-transient reactance is accordingly reduced.

It is to be understood, therefore, that although certain specific embodiments of the invention have been illustrated and described, it is not limited to the exact arrangement shown, but in its broadest aspects it includes all equivalent embodiments and modifications which come within the scope of the appended claims.

I claim as my invention:

1. In a dynamo-electric machine, a rotor member having a plurality of salient pole pieces thereon, each pole piece having an outer peripheral face and laterally extending pole tips, a plurality of conducting bars placed in slots in the face of each pole piece, additional conducting bars on each pole piece placed in slots in the bottom surfaces of the pole tips, and means for connecting all the bars on each pole piece together at both ends, the bars being connected together only on the individual pole pieces.

2. In a dynamo-electric machine, a rotor member having a plurality of salient pole pieces thereon, each pole piece having an outer peripheral face and laterally extending pole tips, a plurality of conducting bars placed in slots in the face of each pole piece, an additional conducting bar at each side of each pole piece, said additional bars being placed in slots in the bottom surfaces of the pole tips and being laterally displaced from the first-mentioned bars, and means for connecting all the bars on each pole piece together at both ends.

ERNEST I. POLLARD.